US008306951B2

(12) United States Patent
Ghosh et al.

(10) Patent No.: US 8,306,951 B2
(45) Date of Patent: Nov. 6, 2012

(54) AUTOMATED INTEGRATED HIGH AVAILABILITY OF THE IN-MEMORY DATABASE CACHE AND THE BACKEND ENTERPRISE DATABASE

(75) Inventors: Sourav Ghosh, Union City, CA (US); Ashish Motivala, San Francisco, CA (US); Charles Hoch, Milpitas, CA (US); Rohan Aranha, San Francisco, CA (US); Ben Fulton, San Francisco, CA (US); Andrey Gusev, Dublin, CA (US); Tirthankar Lahiri, Palo Alto, CA (US); Juan Tellez, Piedmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 194 days.

(21) Appl. No.: 12/719,264

(22) Filed: Mar. 8, 2010

(65) Prior Publication Data

US 2011/0071981 A1    Mar. 24, 2011

Related U.S. Application Data

(63) Continuation-in-part of application No. 12/562,928, filed on Sep. 18, 2009.

(60) Provisional application No. 61/243,874, filed on Sep. 18, 2009.

(51) Int. Cl.
*G06F 17/30* (2006.01)

(52) U.S. Cl. ........ 707/646; 707/610; 707/640; 707/645; 707/647; 707/648; 707/649; 707/650; 707/651; 707/652; 707/653; 707/661; 707/674; 709/214; 709/217; 711/161; 711/162

(58) Field of Classification Search .................. 707/610, 707/640, 645–653, 661, 674, 999.204; 709/214, 709/217; 711/161, 162
See application file for complete search history.

(56) References Cited

U.S. PATENT DOCUMENTS 6,370,622 B1    4/2002 Chiou et al.
(Continued)

OTHER PUBLICATIONS

Oracle®, "TimesTen to TimesTen Replication Guide" Release 7.0, B31684-03, Sep. 2007. http://download.oracle.com/otn_hosted_doc/timesten/703/TimesTen-Documentation/replication.pdf.

(Continued)

*Primary Examiner* — Syling Yen
(74) *Attorney, Agent, or Firm* — Hickman Palermo Truong Becker Bingham Wong LLP; Karl T. Rees

(57) ABSTRACT

A cluster manager is configured to manage a plurality of copies of a mid-tier database as a mid-tier database cluster. The cluster manager may concurrently manage a backend database system. The cluster manager is configured to monitor for and react to failures of mid-tier database nodes. The cluster manager may react to a mid-tier database failure by, for example, assigning a new active node, creating a new standby node, creating new copies of the mid-tier databases, implementing new replication or backup schemes, reassigning the node's virtual address to another node, or relocating applications that were directly linked to the mid-tier database to another host. Each node or an associated agent may configure the cluster manager to behave in this fashion during initialization, based on common cluster configuration information. Each copy of the mid-tier database may be, for example, a memory resident database. Thus, a node must reload the entire database into memory to recover a copy of the database.

21 Claims, 7 Drawing Sheets

U.S. PATENT DOCUMENTS

| | | | |
|---|---|---|---|
| 6,611,898 | B1 | 8/2003 | Slattery et al. |
| 7,548,898 | B1 * | 6/2009 | Tarenskeen et al. ............. 1/1 |
| 2003/0217236 | A1 | 11/2003 | Rowlands |
| 2004/0073754 | A1 | 4/2004 | Cypher |
| 2004/0122910 | A1 * | 6/2004 | Douglass et al. ............ 709/214 |
| 2008/0155303 | A1 * | 6/2008 | Toeroe ............................ 714/2 |
| 2008/0209009 | A1 | 8/2008 | Katwala et al. |
| 2008/0215580 | A1 | 9/2008 | Altinel et al. |
| 2008/0222111 | A1 | 9/2008 | Hoang et al. |
| 2008/0222159 | A1 | 9/2008 | Aranha et al. |
| 2009/0171679 | A1 | 7/2009 | Salgado et al. |
| 2010/0306234 | A1 | 12/2010 | Wang et al. |
| 2011/0072217 | A1 | 3/2011 | Hoang et al. |

OTHER PUBLICATIONS

Oracle®, "TimesTen to TimesTen In-Memory Database Introduction" Release 7.0, B31687-03, Sep. 2007. http://download.oracle.com/otn_hosted_doc/timesten/703/TimesTen-Documentation/intro.pdf.

Oracle® Clusterware, Administration and Deployment Guide, 11g Release 1 (11.1), B28255-06, Oct. 2008. http://download.oracle.com/docs/cd/B28359_01/rac.111/b28255.pdf.

The Times Ten Team, Mid-Tier Caching: The Times Ten Approach, Jun. 2002. ACM SIGMOD, 6 pages.

U.S. Appl. No. 12/562,928, filed Sep. 18, 2009, Office Action, May 17, 2012.

* cited by examiner

AUTOMATED INTEGRATED HIGH AVAILABILITY OF THE IN-MEMORY DATABASE CACHE AND THE BACKEND ENTERPRISE DATABASE

PRIORITY CLAIM

This application claims benefit of U.S. Provisional Application No. 61/243,874, filed Sep. 18, 2009, the entire contents of which is hereby incorporated by reference as if fully set forth herein, under 35 U.S.C. §119(e). This application claims benefit under 35 U.S.C. §120 as a Continuation-in-part of application Ser. No. 12/562,928, filed Sep. 18, 2009, entitled "Distributed Consistent Grid Of In-Memory Database Caches," by Hoang, et al, the entire contents of which application is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s). This application is also related to U.S. patent application Ser. No. 12/030,113, filed Feb. 12, 2008, entitled "Database System with Dynamic Database Caching," by Hoang et al.; and U.S. patent application Ser. No. 12/030,094, filed Feb. 12, 2008, entitled "DATABASE SYSTEM WITH ACTIVE AND STANDBY NODES," by Aranha et al., the entire contents of each of which are hereby incorporated by reference for all purposes as if fully set forth herein.

FIELD OF THE INVENTION

Embodiments of the invention described herein relate generally to mid-tier databases, and, more specifically, to techniques for providing high availability for a mid-tier database.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Service providers provide end users with services that involve data originating from persistent data sources. The data sources themselves are often unequipped to provide such services. Instead, end users connect via clients to applications that provide these services. Applications, in turn, interact with the data sources to provide these services.

Database and Database Servers

One source of data is a database. A database is a collection of logically related data and metadata. From a high-level perspective, that data and metadata is organized into logical structures, for example, according to relational and/or object-relational database constructs. Database metadata defines database objects, such as tables, object tables, views, or complex types.

One database implementation involves the maintenance of data representative of the database in a storage mechanism such as, for example, a persistent storage device. A database server or like process(es) provides access to the data and metadata by reading from and writing to the storage. In many cases, the data representative of the database is stored in storage-based structures that differ from the logical structure of the database—for example, in data blocks on a hard disk. Accordingly, the database server translates some of the data representative of the database into logical structures, such as tables, rows, and columns, in order to perform operations that make reference to those logical structures. When the database server has finished performing the operations, if data in any of the logical structures has changed, the database server translates the logical structures back into the storage-based structures and causes those structures to be stored in the storage.

Applications interact with database servers via database commands such as SQL statements. These database commands cause the database servers to perform the above mentioned database operations. These operations may include, for example, providing a subset of data to the application, modifying records in the database, searching for data that meets certain criteria, sorting data, performing an analysis of the data, and so on. In many cases, as a result of the operations, database servers return "result sets" to the applications in the form of logically structured data.

Tiers

The above described interactions are characterized as occurring across three levels or "tiers." The first of these levels is known as the "client-side," and involves the end user operating a client. For example, an end user may operate a web browser or other user interface to request online services such as booking a flight. Or, as another example, a user may operate a cell phone to request a telephone service.

The second level is a server-side level known as the "mid-tier," and involves applications. Generally, a component may be described as being in the "mid-tier" if it is deployed between two components in a chain of interactions—more specifically, if it responds to requests from one component by sending a request to another component. As used herein, however, the term "mid-tier" may more specifically refer to any component that responds to requests from any other component by interacting with data originating from one or more backend data sources, such as a backend database server. For example, a website running at the mid-tier may provide a web interface for booking a flight to a user, and in response to requests from the user, request flight data from a database server. Or, as another example, cellular switching software at the mid-tier may rely on data from a database server to determine how to respond to a cell phone's request to make a call.

The final level is a server-side level known as the "backend," and involves one or more data sources, such as a file system, web server, or a database server and database. For example, where the one or more backend data sources is a database system, the backend level comprises, essentially, one or more persistent databases stored at one or more persistent storage devices, any database servers that interact directly with the persistent storage device to provide access to logical structures stored in the one or more persistent databases, and any components that manage the persistent storage devices or the backend database servers. For example, the backend may comprise a clustered database system that is managed by a cluster manager.

Because backend database systems are a particularly common form of backend data, the remainder of this application shall refer extensively to the use of backend database systems. However, the techniques described herein are just as applicable to any other source of data stored persistently at the backend level.

In some embodiments, the computing devices implementing components at each level are physically distinct from the computing devices at each other level. For example, database servers and mid-tier applications are often implemented at different computing devices. However, in other embodiments, physical separation is not strictly maintained.

Mid-Tier Database

For some applications, it is advantageous to implement one or more database systems on computing devices that are in the mid-tier—in other words, computing devices that implement mid-tier applications as opposed to backend components. Mid-tier databases provide mid-tier applications with faster access to data by bringing the data closer to the applications. Moreover, in some embodiments a mid-tier database may be stored entirely within a memory that is faster than the storage mechanism used predominately for the backend databases, further increasing the speed with which mid-tier applications can access data. For example, data representative of a mid-tier database may be stored in a volatile, random access memory. However, benefits may be realized from using a mid-tier database even without the mid-tier database being stored in such a memory.

Mid-Tier Caching

In an embodiment, only a small subset of the data required by the mid-tier applications can be maintained in the mid-tier level. This may be true for a variety of reasons. For example, the amount of memory or storage available at the mid-tier level may be much smaller than the amount of data needed by the mid-tier application. For this reason, the mid-tier applications rely on a backend database. Unfortunately, access to a backend database incurs various "roundtrip" communication costs resulting from, for example, transmission overhead, limited transmission speeds, and/or limited transmission bandwidth. Thus, mid-tier applications sometimes cache certain objects from the backend database at the mid-tier level.

One technique for implementing a mid-tier cache is to utilize a mid-tier database as a cache of certain critical data in the backend database. The subset of data stored in the mid-tier database may be selected because it is most frequently accessed or most critical to the mid-tier applications. For other data, the mid-tier applications access the backend database. In this manner, a mid-tier database can be used to cache frequently accessed data from the backend database so as to avoid requiring the mid-tier applications to constantly incur round-trips to the backend database server.

In an embodiment, a cache agent is responsible for controlling which elements of the database are cached in the mid-tier database. For example, the cache agent implements a policy that calls for loading cached copies or "instances" of backend elements into the mid-tier database dynamically when their corresponding elements are requested by the mid-tier applications. The cache agent also manages the size of the mid-tier database by ensuring that older and/or less used cache instances are removed from the mid-tier database as needed. An example of such an embodiment is described in "Database System with Dynamic Database Caching."

Directly-Linked Mid-Tier Applications

Like backend database systems, mid-tier database systems may feature a database server to which mid-tier applications may connect to access data in the mid-tier database. However, in some embodiments, mid-tier applications execute in the same memory space that stores the mid-tier database, and thus may read and write directly to the mid-tier database. Thus, these mid-tier applications forego the need to establish a communication link with a database server, further increasing the speed with which the mid-tier applications may access data in the mid-tier database. Such mid-tier applications are hereinafter referred to as "directly-linked" applications. A vendor may simplify development of directly-linked mid-tier applications for third parties with the provision of pre-compiled libraries of instructions that perform many of the same functions as a database server, as well as an application programming interface (API) for utilizing those instructions. For convenience, any functions described herein as being performed by a database server at the mid-tier level, may also be understood as being performed by an executing instance of such instructions, invoked by a directly-linked application.

Note that the internal functioning of a mid-tier database server is different than a backend database server, and thus the two types of database servers are not to be confused. For example, mid-tier database servers may be optimized to compile queries differently than backend database servers, owing to factors such as differing assumptions about the speed at which data may be retrieved from memory, as well as consideration of the caching relationship between the backend database and the mid-tier database.

Reliability of Mid-Tier Databases

One challenge in deploying mid-tier databases is dealing with failures of the mid-tier databases. One approach is to deploy multiple copies of the mid-tier database. Each copy of the mid-tier database is monitored by one or more threads or processes that propagate transactions to other copies of the mid-tier database. (Note that, for simplification, the terms thread and process shall subsequently be used interchangeably throughout this application). The mid-tier applications are made aware of these multiple copies, and when one of the copies fails, the mid-tier applications are configured to interact instead with another copy of the mid-tier database.

One such scheme is described in "DATABASE SYSTEM WITH ACTIVE AND STANDBY NODES." An active copy and a standby copy of a mid-tier database are maintained. Both copies may be readable. However, applications may only perform write operations at the active copy. Transactions at the active copy are propagated to the standby copy. When the active copy fails, a database administrator sends a command to a process linked to the standby copy to cause the standby copy to become the active copy. The administrator also sends commands to restart any directly linked applications, so that they are linked to the new active copy. Applications and clients can then be configured to interact with the new active copy instead of the failed active copy.

A drawback to deploying multiple copies of a mid-tier database is that such deployments are administratively complex. Administrators must furthermore constantly monitor the mid-tier databases to identify failures and react accordingly. Administrators can develop script-based processes to automate the monitoring of a database and failover to a standby database, but development and maintenance of such scripts can be expensive and inconvenient. For example, the scripts must be changed any time the configuration of the database changes. Also, the administrator must configure processes to monitor any directly-linked applications, and, in the event of a directly linked application failing, restart the directly-linked application with an appropriate configuration. Moreover, each non-directly-linked application must be made aware of the multiple copies and configured with logic for detecting and reacting to a failed database. These and other obstacles impede and in many cases prevent the realization of many of the benefits of using mid-tier databases.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
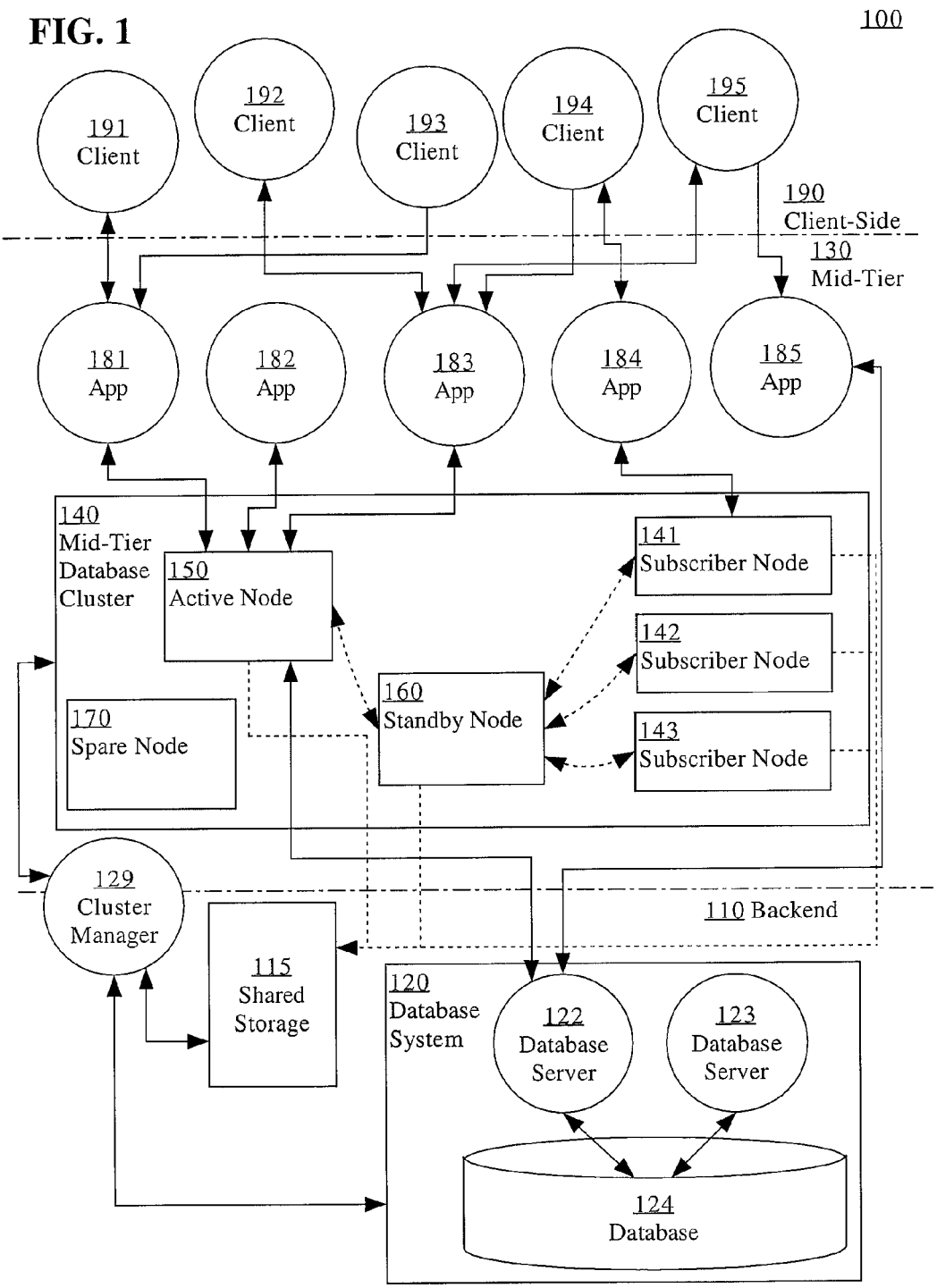
FIG. 1 is a block diagram of a system 100 in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
 1.0. General Overview
 2.0. Structural Overview
  2.1. Tiers
  2.2. Mid-Tier Database Hosts
 3.0. Functional Overview
  3.1. Mid-Tier Cluster Configuration and Monitoring
  3.2. Detecting Node Failure
  3.3. Recovering from Failure of an Active Node
  3.4. Recovering from Failure of a Standby Node
  3.5. Recovering from Failure of both an Active and Standby Node
 4.0. Additional Implementation Examples
  4.1. Recovery for Read-Only Subscribers
  4.2. Configuration Files
 5.0. Implementation Mechanism—Hardware Overview
 6.0. Extensions and Alternatives 1.0. General Overview Approaches, techniques, and mechanisms are disclosed for maintaining a cluster of mid-tier databases. A cluster manager is configured to manage a plurality of copies of a mid-tier database as a mid-tier database cluster. The cluster manager manages the cluster by, among other actions, monitoring each copy of the mid-tier database for failures, as well as quickly recovering from such failures using a variety of recovery strategies.

According to an embodiment, the cluster manager may also concurrently manage a backend database cluster to which at least a subset of the data in the mid-tier database is kept synchronized. Because the same cluster management software may be used to manage both the mid-tier database and the backend database, deployment of the mid-tier database cluster is simplified.

According to an embodiment, a mid-tier database cluster comprises at least two mid-tier database nodes. At any given time, a first of these mid-tier database nodes is designated as an active node that accepts updates from applications, while a second of these mid-tier database nodes is designated as a hot standby node whose database is always up-to-date with the database of the active node. The standby node is capable of becoming the active node almost instantaneously in the event of failure at the active node. Multiple of such mid-tier database clusters may reside in the mid-tier, any or all of which may be connected to a single backend database cluster.

In an embodiment, each mid-tier database node (or an agent associated therewith) is initialized by accessing common configuration information defining the mid-tier database cluster. The configuration information may specify, for example, one or more hosts that are available to implement mid-tier database nodes, one or more synchronization and/or backup schemes for the clustered data, one or more applications to execute in association with various nodes of the mid-tier database cluster, virtual address information, and so on. Based on this information, at least one of the nodes in the database cluster is configured to replicate changes in a copy of an element in the mid-tier database to a copy of the element in a backend database. Further based on this information, each node (or its associated agent) configures a cluster manager to: 1) monitor status information for the node; and 2) in response to detecting a failure of the node's copy of the mid-tier database, trigger one or more recovery processes in the mid-tier database cluster. Among other recovery responses, the recovery processes may recover a copy of the mid-tier database at the failed node or a spare node. The recovery processes may also cause a new node to provide to a client services involving transactions in the mid-tier database, which services were, at the time of the failure, being provided by the failed node. According to an embodiment, each copy of the mid-tier database may be, for example, a memory resident database. Thus, a node reloads the entire database into memory to recover a copy of the database.

According to an embodiment, the cluster manager is configured to automatically respond to a failure at an active node by causing, nearly instantaneously, a standby node to assume the role of the active node. Furthermore, the cluster manager causes a copy of the database to be recovered. The recovery may occur at either the failed node, once it returns to service, or a spare node. The recovery node may recover the copy by, for example, loading a new copy of the database into memory based on recovery information communicated by the new active node and/or stored in a shared or local storage. The recovery node assumes the role of standby node and as such begins replicating transactions performed by the new active node.

According to an embodiment, the cluster manager is configured to automatically respond to a failure at a standby node by causing a copy of the database to be recovered at a recovery node. The recovery node may be either the standby node, once it returns to service, or an spare node. The recovery node assumes the role of standby node.

According to an embodiment, the cluster manager is configured to automatically respond to concurrent failures of the active node and the standby node by causing a copy of the database to be recovered at two recovery nodes. The recovery node may recover the copy by, for example, loading a new copy of the database into memory based on recovery information communicated by the backend database system and/or stored in a shared or local storage. The recovery nodes may include the failed nodes, once they return to service, and/or spare nodes. One recovery node is assigned as an active node, while another is assigned as a standby node.

According to an embodiment, one or more applications executing at the same host as a node of the mid-tier database cluster are designated as dependent upon the node, in that they rely upon data in the node's copy of the mid-tier database in order to properly provide clients with services. In response to a failure of the node's copy of the mid-tier database, the one or more applications are automatically relocated to the node that assumes the role of the failed node. For example, one or more applications may be directly linked to an active node. When the active node fails, the one or more applications are stopped at the host of the failed active node, and started at the host of the new active node. According to an embodiment, these dependencies are described in the cluster configuration information. Based on the described dependencies, the node or its associated agent configures the cluster manager to cause this application relocation in response to a database failure.

According to an embodiment, each node's host is assigned a virtual address. When a node fails, if the node's failed database is recovered at a spare node, the cluster manager causes the node's virtual address to be reassigned to the host of the spare node. Applications may be configured to route database commands through each node's virtual address as opposed to through the physical addresses of each node's respective host. In this manner, applications may be transparently redirected to replacement nodes, without having to implement special logic to detect the existence of the replacement nodes. Moreover, clients of directly linked applications may communicate with those applications via the virtual address. Since the cluster manager will also automatically start the applications at the host of the replacement node, the reassignment of the virtual address to the replacement node ensures that the clients will automatically be redirected to working versions of the applications in the event of database failure. In other aspects, the invention encompasses a computer apparatus and a computer-readable medium configured to carry out the foregoing steps.

2.0. Structural Overview

FIG. 1 is a block diagram of a system 100 in which the techniques described herein may be practiced, according to an embodiment of the invention. FIG. 1 is but one example of a system capable of implementing the techniques described herein. Other systems may include more or fewer components in different arrangements. Moreover, the distribution of work between components may vary from system to system.

2.1. Tiers

System 100 comprises a backend 110, mid-tier 150, and client-side 190. Backend 110 comprises a shared storage space 115 and a database system 120. Mid-tier 130 comprises a mid-tier database cluster 140 and multiple applications 181-185. Client-side comprises clients 191-195. A cluster manager 129 is implemented by components in both mid-tier 130 and backend 110.

Client-Side

Clients 191-195 may be, for example, web browsers, desktop applications, mobile applications, and so on. Clients 191-195 request services from mid-tier applications 181-185.

Mid-Tier

Mid-tier applications 181-185 may be, for example, web applications, servers, service providers, and so forth. In an embodiment, mid-tier applications 181-185 are any applications that rely upon data originating from backend database system 120 but were not provided by the vendor of backend database system 120. However, in other embodiments, some or all of mid-tier applications 181-185 may be vendor-provided. To provide the services requested by clients 191-195, mid-tier applications 181-185 rely on data that is persistently maintained at database system 120, some of which data may be cached for more efficient access at mid-tier database cluster 140. Mid-tier applications 181-185 may further rely upon data that is found exclusively at mid-tier database cluster 140.

Mid-tier database cluster 140 comprises nodes 150, 160, 141, 142, and 143. Nodes 150, 160, 141, 142, and 143 are each, in essence, self-contained mid-tier database systems, comprising both a data store with one or more databases as well as implementations of database access routines for accessing the data stored therein. Nodes 150, 160, 141, 142, and 143 are each capable of responding to database commands from applications 181-185 by retrieving and/or manipulating the data stored in their respective databases. Nodes 150, 160, 141, 142, and 143 may be implemented on separate hosts. Or, one or more of nodes 150, 160, 141, 142, and 143 may be implemented on a shared host. Furthermore, some or all of applications 181-185 may be implemented on the same hosts as nodes 150, 160, 141, 142, and 143.

Nodes 150, 160, 141, 142, and 143 are all considered part of the same mid-tier database cluster because they each store a copy of a particular data set. Nodes 150, 160, 141, 142, and 143 maintain the consistency of the particular data set through any of a variety of synchronization techniques, including replication and/or propagation. Such techniques are described in, for example, "DATABASE SYSTEM WITH ACTIVE AND STANDBY NODES."

At least one of nodes 150, 160, 141, 142, and 143 maintains consistency between this particular data set and the database system 120. For example, the data in mid-tier database cluster 140 may include a cache of a subset of data found in database system 120, kept consistent with database system 120 by node 150. Again, consistency may be maintained through any of a variety of techniques, including techniques such as described in "Distributed Consistent Grid Of In-Memory Database Caches." However, in some embodiments the particular data set may or may not have originated from database system 120. Furthermore, nodes 150, 160, 141, 142, and 143 may store data sets other than the particular data set.

With respect to the particular data set, node 150 is considered the "active node." The mid-tier applications thus access the particular data set primarily through node 150. In fact, write access to the particular data set is provided exclusively through active node 150. Meanwhile, node 160 is designated as a "standby node." Node 160 is kept consistent at least asynchronously with transactions at node 150, so that if node 150 were to fail, node 160 may take the place of node 150 with minimal recovery efforts. For example, changes to node 150 may be constantly replicated at node 160 based on transaction logs communicated by node 150 to node 160. In an embodiment, mid-tier database cluster 140 may feature additional standby nodes, or no standby node at all. Moreover, mid-tier database cluster 140 may feature multiple active nodes, kept consistent through any suitable means.

Nodes 141-143 are "subscriber nodes," and may be used to provide read-only access to the particular data set (e.g. for application 184). In an embodiment, changes at active node 150 are propagated or replicated to these nodes less frequently than to standby node 160. For example, changes may be replicated from standby node 160 instead of active node 150, thereby introducing additional delay in synchronizing subscribed nodes 141-143. Or, transaction logs may be buffered and communicated less frequently to subscriber nodes 141-143. Mid-tier database cluster 140 may feature any number of subscriber nodes, including none at all.

Mid-tier database cluster 140 further comprises spare node 170. Spare node 170 does not provide the particular data set to applications 181-185, and in fact may not be involved in any replication or propagation scheme involving the particular data set. Rather, spare node 170 may be utilized for recovering from failures at any of nodes 141-143, 150, or 160. Specifically, spare node 170 may replace any of nodes 141-143, 150, or 160, should any of nodes 141-143, 150, or 160 be unable to recover from a failure. In an embodiment, any number of spare nodes may be specified for mid-tier database cluster 140, including none at all.

In an embodiment, mid-tier 130 may comprise multiple mid-tier database clusters 140. Each mid-tier database cluster 140 is associated with a different data set. Some or all of the mid-tier nodes may store data for multiple sets of clustered data, and therefore belong to multiple mid-tier database clusters 140. For example, node 150 may be an active node for one set of data, and a standby node for another set of data.

Backend

Database system 120 comprises a database server 122, a database server 123, and a database 124, each being implemented by one or more shared or separate host devices. Database 124 is a collection of logically related data stored at, for example, a pool of one or more persistent storage devices such as hard disks or storage arrays. Database 124 may be, for example, a relational database. In an embodiment, database 124 is distinguished from databases in mid-tier cluster 140 in that it is stored in media that performs read and/or write operations more slowly than the media upon which databases in mid-tier cluster 140 are stored. In an embodiment, database 124 is distinguished from databases in mid-tier cluster 140 in that mid-tier cluster 140 stores only a subset of the data found in database 124.

In an embodiment, database servers 122 and 123 directly provide access to database 124 for one or more applications. For example, as depicted, database server 122 directly provides access to database 124 for application 185. Specifically, database server 122 responds to database commands from application 185 by performing operations for storing, retrieving, and manipulating data stored in database 124. Database servers 122 and 123 further provide indirect access to database 124 for one or more applications by providing data to be cached in mid-tier database cluster 140. For example, as depicted, database server 122 provides data to be cached at mid-tier database cluster 140. The cached data is then accessed by applications 181-184.

In an embodiment, the nodes of mid-tier database cluster 140 are distinguished from backend database system 120 because they are implemented on hosts at which mid-tier applications such as applications 181-185 execute, whereas no mid-tier applications execute on any host that implements database system 120. However, this distinction need not be strictly maintained.

While the embodiment depicted in FIG. 1 consists of only a single backend database system with two backend database servers and a backend database, other embodiments permit caching of data from any number of backend database systems with any number of database servers and databases.

Cluster Manager

Cluster manager 129 manages database system 120 as a backend database cluster. That is to say, cluster manager 129 monitors database 124 and database server 122 and 123 to ensure that they operate collectively in a consistent manner. Among other functions, cluster manager 129 may employ various techniques for recovering from failures at any of the components in database system 120. Cluster manager 129 may be implemented by one or more processes executing on any of a number of host servers in the backend, including the hosts executing database servers 122 and 123, as well as a dedicated host server. In an embodiment, each machine hosting a component of database system 120 executes an instance of cluster management logic, and these instances communicate with each other in a coordinated fashion to collectively implement cluster manager 129. An example cluster manager is described in "Oracle Clusterware: Administration and Deployment Guide" by Oracle Corporation, October 2008, available at the time of writing at http://download.oracle.com/docs/cd/B28359_01/rac.111/b28255.pdf, the entire contents of which are hereinafter incorporated by reference as if set forth in their entirety.

Cluster manager 129 relies upon shared storage 115 for storage of various information necessary to manage database system 120, such as data describing cluster configuration settings, cluster resources, system status, and/or ownership mappings. In an embodiment, shared storage 115 is further utilized by mid-tier nodes 141-143, 150, and 160 to store recovery information, such as snapshots and transaction logs. Shared storage 115 may be implemented by one or more persistent storage devices. Although depicted as residing in backend 110, some or all of shared storage 115 may be provided by devices in mid-tier 130.

The functionality of cluster manager 129 is extended to automatically manage mid-tier database cluster 140. Among other functions, cluster manager 129 starts, monitors, and/or reacts to failures at the various nodes of mid-tier cluster 140, so as to ensure that the data in mid-tier cluster 140 remains both consistent and highly available. In an embodiment, cluster manager 129 also provides various availability services to some or all of applications 181-185. Examples of interactions between cluster manager 129 and the various components of mid-tier 130 are described more fully throughout the remaining sections of this disclosure.

In an embodiment, one or more of the machines hosting a node 141-143, 150, 160, or 170 executes an instance of the cluster management logic, thereby participating in the implementation of cluster manager 129. In an embodiment, cluster manager 129 is implemented exclusively in the backend.

2.2. Mid-Tier Database Hosts

Figure 2:
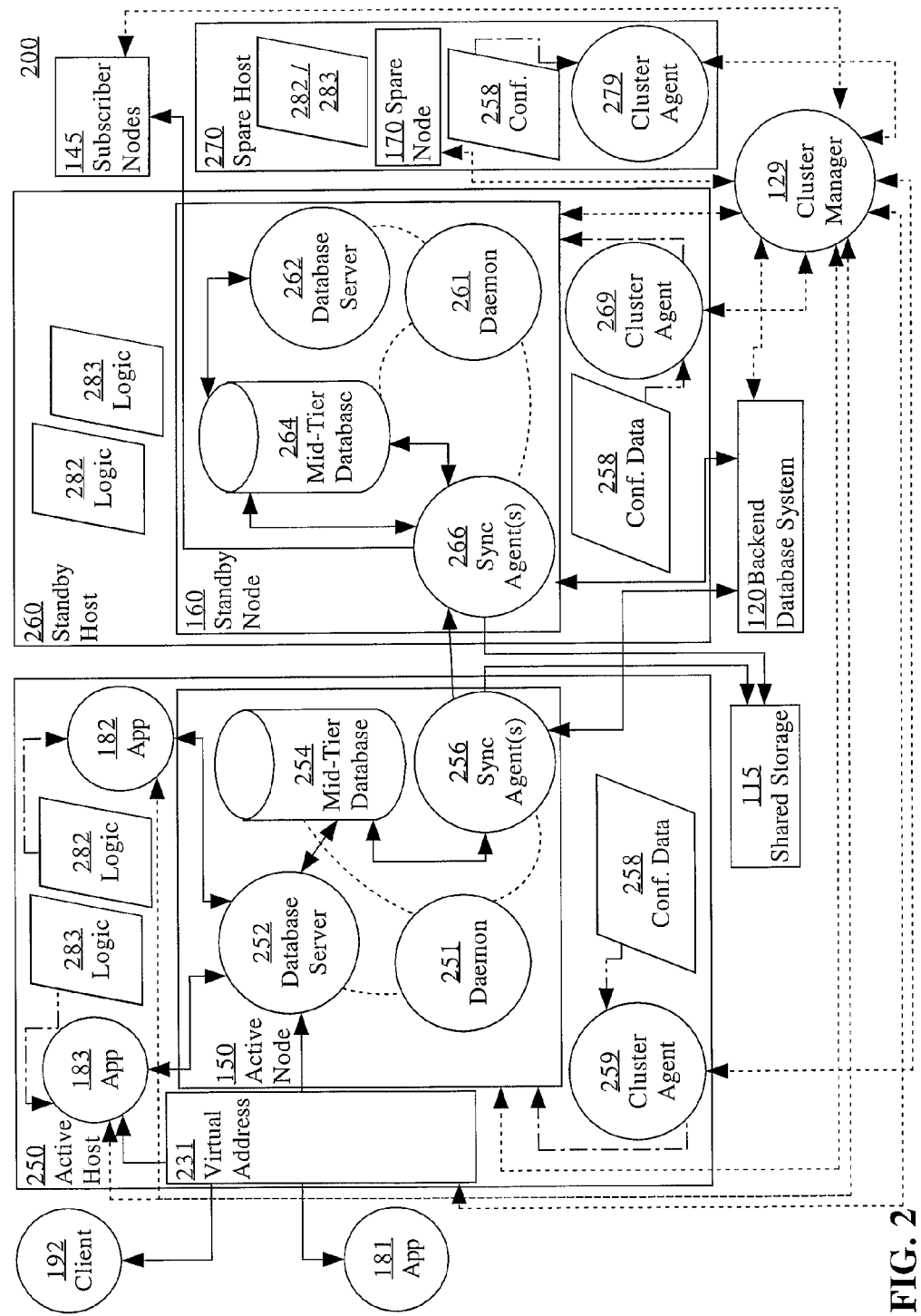
FIG. 2 is a block diagram 200 illustrating various components of a mid-tier database cluster 140 in greater detail, along with various interactions between the components of system 100 at large.

FIG. 2 is a block diagram 200 illustrating various components of mid-tier database cluster 140 in greater detail, along with various interactions between the components of system 100 at large. Again, FIG. 2 provides but one example of a system capable of implementing the techniques described herein. Other systems may include more or fewer components in different arrangements. Moreover, the distribution of work between components may vary from system to system.

As depicted in FIG. 2, mid-tier database nodes 150, 160, and 170 of FIG. 1 are implemented by hosts 250, 260, and 270, respectively. Hosts 250, 260, and 270 are deployed in mid-tier 130, and are distinct from any hosts used to implement backend database system 120. Note that, for simplification, the hosts used to implement backend database system 120 and various other components of FIG. 2 are not depicted in FIG. 2. Hosts 250, 260, and 270 also comprise a number of other components depicted in FIG. 2, including application logic 282 and 283 for executing applications 182 and 183, a virtual address 231, cluster configuration data 258, and cluster agents 259, 269, and 279.

FIG. 2 further depicts various components already described with respect to FIG. 1, including client 192, application 181, shared storage 115, cluster manager 129, and subscriber nodes 145, each of which may be implemented at any one or more hosts, including hosts 250, 260, and 270 as well as other hosts not depicted.

Mid-tier database nodes 150 and 160 each respectively comprise the following components: a daemon 251 or 261, a database server 252 or 262, a mid-tier database 254 or 264, and sync agent(s) 256 or 266. Nodes 150 and 160 may further comprise any number of additional components as needed. Each component is implemented by one or more processes at each node's respective host 250 or 260. Although spare node 170 has the potential to implement the above listed components in response to failures at nodes 150 or 160, spare node 170 may or may not comprise such components while nodes 150 and 160 are operating as active and standby nodes, respectively. Because such components of node 170, even if running while nodes 150 and 160 function as active and standby nodes, are nonetheless not actively participating in the replication of the particular data set involved in mid-tier database cluster 140, the components are not depicted in FIG. 2.

For convenience, nodes 150, 160, and 170 are described herein as performing tasks that are actually performed by subcomponents such as daemons 251 and 261, sync agents 256 and 266, as well as associated components such as cluster agents 259 and 269. Thus, any task described or implied as being performed by a node should be understood as being performed by any one or more processes executing at or in association with the node. Similarly, tasks described or implied as being performed by hosts 250, 260, or 270, should be understood as being performed by any one or more processes executing at hosts 250, 260, or 270.

Mid-Tier Databases

Mid-tier databases 254 and 264 are collections of data stored in mid-tier 130. In an embodiment, mid-tier databases 254 and 264 each comprise a plurality of tables stored entirely within a volatile memory at their nodes' respective host, such as a Random Access Memory (RAM). Mid-tier databases 254 and 264 may further comprise additional components stored in a volatile memory, including indexes and temporary space. Other components of mid-tier databases 254 and 264 may include transaction logs and recovery data, such as snapshots, stored in a non-volatile memory such as a flash disk or hard disk. In an embodiment, additional or even all components of mid-tier databases 254 and 264 are stored in a non-volatile memory.

Mid-tier database nodes 150, 160, 170, and 141-143 may each additionally comprise other mid-tier databases, some of which may be grouped into other mid-tier database clusters, and some of which may not be involved in any cluster.

For simplification, the techniques described herein are described primarily with respect to an embodiment where the set of clustered data encompasses an entire mid-tier database. However it should be understood that certain actions or steps involving a "mid-tier database" (or copies thereof) may in some embodiments involve only a particular subset of data, within a mid-tier database, that has been defined as belonging to a particular mid-tier cluster.

Mid-Tier Database Servers

Mid-tier database servers 252 and 262 are executing instances of logic for responding to database commands by performing operations for storing, retrieving, and manipulating data stored in mid-tier databases 154 and 164, respectively. In an embodiment, a vendor-provided server process invokes database servers 154 and 164 to handle database commands received from application 181 over a communication channel (e.g. SQL statements transmitted via TCP/IP over an open socket to a database server port).

In an embodiment, one or more of database servers 152 and 162 may be temporary instances of database access routines, instantiated as needed for single database transactions. In such embodiments, database servers 152 and 162 are instantiated via calls to a database library API by a directly-linked application. Note that, because each database application may invoke its own database server thread, multiple database server threads may run concurrently. In an embodiment, database servers 152 and 162 may be invoked at the same time both by directly-linked applications, as well as by a background database server process responding to statements over a communication channel.

For example, mid-tier database 254 may be resident within a memory that is directly accessible to applications 182 and 183. Applications 182 and 183 may therefore read data from mid-tier database 254 directly, without having to send a query over a communication channel. To simplify the process of applications 182 and 183 reading mid-tier database 254 directly, a vendor may supply a code library of database access routines. Applications 182 and 183 may thus read data from mid-tier database 254 by making calls via the database library API to execute the provided routines. These calls result in, essentially, applications 182 and 183 invoking database server threads, which for simplicity are hereinafter referred to as database servers.

Synchronization Agents

Sync agents 256 and 266 are each one or more agents responsible for synchronizing data between mid-tier database nodes and/or backend database system 120. Synchronization may be accomplished by any suitable synchronous or asynchronous techniques. For simplification, this application shall refer to any process of synchronizing changes from one database or database copy to another as the replication or propagation of changes. However, for the purposes of this disclosure, "replication," "propagation," and like terms should all be understood to equally refer to any technique for ensuring that a change in one data store is also made in another data store.

Sync agents 256 and 266 further include any number of components to assist in synchronization. For example, sync agents 256 and 266 may include one or more components that function as replication agents that replicate transactions from active node 150 to standby node 160. The replication agents may further replicate the transactions from standby node 160 to subscriber nodes 145. As another example, sync agents 256 and 266 may further include one or more components that function as propagation agents, in that they propagate changes back and forth between mid-tier cluster 140 and database system 120. As yet another example, sync agents 256 and 266 may include one or more components that function as mid-tier caching agents. Sync agents 256 and 266 may further be responsible for backing up recovery information to shared storage 115. For example, sync agents 256 and 266 may periodically record transaction logs and/or snapshots to shared storage 115 and/or persistent storage at one or more of hosts 250, 260, and 270.

Daemons

Daemons 251 and 261 are each one or more processes responsible for various resource management tasks at their respective nodes. Functions performed by daemons 251 and 261 may include, for example, maintaining and reporting statistics regarding data usage and connections at mid-tier database 254 or 264, managing shared memory access and policies, and starting and/or recovering various components of their respective mid-tier nodes, including one or more of mid-tier databases 254 and 264, database servers 252 and 262, and sync agents 256 and 266.

For example, daemons 251 and 261 may each be capable of launching processes for various components of mid-tier node 150 or 160, respectively, and may do so in response to the daemon being started or in response to the daemon receiving various commands over an open socket or command-line interface.

In an embodiment, daemons 251 and 261 may also be responsible for monitoring some or all of these various components for failures. Daemons 251 and 261 may report these failures to other components, or may react to these failures by re-launching any appropriate processes and, if necessary, recovering their respective mid-tier databases. However, in other embodiments, some or all of this monitoring is performed by other components, such as cluster agent 259 or cluster manager 129, which in turn instruct daemon 251 or 261 to perform any appropriate recovery tasks.

Applications

Mid-tier host 250 executes mid-tier applications 182 and 183. Applications 182 and 183 are executing instances of application logic 282 and 283, respectively. Application logic 282 and 283 resides at or is readily accessible to host 250 in any suitable form, including executable code and/or hardware. To facilitate various functionalities described herein, copies of application logic 282 and 283 also reside at or are readily accessible to hosts 260 and 270. Mid-tier host 250 also comprises or communicates with application 181. Mid-tier host 250 may further comprise or communicate with any number of additional applications.

Mid-tier applications 181-183 communicate with database server 252 via, for example, database commands, to access data stored in mid-tier database 254. Applications 181-183 use this data, for example, to provide services requested by various of clients 191-195.

In an embodiment, application 181 communicates with database server 252 via a communication mechanism that is slower than the communication mechanism by which applications 182 and 183 communicate with database server 252. For example, application 181 may execute at a host other than host 250, and may therefore need to communicate with database server 252 over a relatively slow network connection. Applications 182 and 183, by contrast, may reside on host 250 and therefore be capable of foregoing communication via the slow network connection.

In an embodiment, application 181 must establish a communication link via an open socket with a persistently executing instance of database server 252, whereas applications 182 and 183 are capable of communicating with database server 252 without having to open any sockets. For example, applications 182 and 183 may communicate with database 252 via in-memory API calls. In fact, applications 182 and 183 may instantiate their own objects 252 as needed to access mid-tier database 254.

In an embodiment, application 181 is configured with data identifying the locations of various hosts of components of the mid-tier database cluster (e.g. the IP addresses of hosts at which the active and standby nodes may reside). Application 181 periodically monitors the nodes at these locations to determine which location corresponds to active node 150. For example, application 181 may periodically address polling requests to a certain port at the locations of hosts 250 and 260. Nodes 150 and 160 may receive these polling requests and respond to application 181 with status information indicating which of nodes 150 and 160 is the active node 150. At any given time, application 181 will only address write requests to the location at which the active node resides. Client 192 may be similarly configured to poll pre-configured locations to determine which of hosts 150 or 160 currently host application 183.

By contrast, by virtue of various techniques described in subsequent sections, applications 182 and 183 are guaranteed to always be executing at the same host as the active node, and therefore require no such configuration information or status polling.

As depicted, mid-tier hosts 260 and 270 do not execute applications 182 and 183. However, mid-tier hosts 260 and 270 have easy access to application logic 282 and 283, so that they may execute applications 182 and 183 in the event of a failure at host 250. Moreover, mid-tier hosts 260 and 270 may execute any number of other applications. For example, host 260 may execute certain read-only applications designated as "standby" applications to be run in association with a standby node in mid-tier cluster 140.

Virtual Address

Host 250 is assigned a virtual address 231 by which components external to host 250 may address communications to host 250 and its various components. For example, application 181 and client 192 communicate with components of host 250 by addressing communications to virtual address 231.

Virtual addresses 231 is considered "virtual" in that it is automatically assigned to another host in mid-tier 130 upon the occurrence of certain events. For example, if node 150 were to fail, and its database were to be recovered either as a standby database or active database at spare host 270, virtual address 231 would be reassigned to spare host 270. In an embodiment, this reassignment may cause application 181 and client 192 to communicate with components of host 270 instead. The various components of host 270 may be configured to behave in a manner consistent with the various components of host 250, so that application 181 and client 192 are unaware of the fact that they are communicating with host 270 instead of host 250.

In an embodiment, virtual address 231 is a virtual Internet Protocol (IP) address. In an embodiment, virtual address 231 co-exists with one or more real IP addresses assigned to specific physical interfaces at host 250. In contrast to virtual IP address 231, the real IP addresses are held persistently by host 250, in that they are not reassigned when virtual address 231 is reassigned. In fact, messages to and from virtual address 231 may be routed through these real IP addresses until certain failures occur, at which time virtual address 231 will be re-routed through the real IP addresses of another host.

In an embodiment, each node in mid-tier cluster 140 is associated with a different virtual address.

Cluster Agents

Each of hosts 250, 260, and 270 maintains or has access to a copy of the same cluster configuration data 258. Cluster configuration data 258 may describe a number of aspects of mid-tier cluster 140, including: hosts at which to implement mid-tier database nodes, the number and types of nodes to include in the cluster (e.g. active/standby nodes), the database(s) and application(s) to cluster, management access command for each clustered application, mid-tier and backend replication schemes, and so on. Configuration data 258 may be maintained locally or in a shared storage in any suitable form, including one or more files, databases, registry entries, and/or objects.

Based on configuration data 258, cluster agents 259, 269, and 279 and/or other cluster components take any of a number of steps to cause hosts 250, 260, and 270 to implement mid-tier cluster 140. For example, cluster agents 259 and 269 may start daemons 251 and 261, respectively, thereby initializing mid-tier nodes 150 and 160. Cluster agents 259 and 269 may also pass configuration parameters to daemons 251 and 261 to assist daemons 251 and 261 in initializing mid-tier databases 254 and 264. Cluster agents 259 and 269 may also start applications 182 and 183. Cluster agents 259 and 269 may also start various sync agents 256 and 266. Cluster agents 259 and 269 may then configure the sync agents 256 and 266 to employ one or more synchronization schemes, such as replication from active node 150 to standby node 160 and subscriber nodes 145, as well as synchronization between active node 150 and backend database system 120. Cluster agents 259 and 269 may further configure sync agents 256 and 266 to periodically store recovery information, such as transaction logs and/or snapshots to shared storage 115.

In an embodiment, cluster agents 259, 269, and 279 each communicate with cluster manager 129 to cause cluster manager 129 to manage nodes 150 and 160 and applications 182 and 183. In an embodiment, cluster agents 259, 269, and 279 accomplish this step by providing cluster manager 129 with information describing which components of mid-tier cluster 140 should be running, how to determine if said components are running correctly, and a list of one or more actions to take in response to a failure.

In an embodiment, cluster agents 259, 269, and 279 further generate scripts that, when executed, cause hosts 250, 260, and/or 270 to perform various recovery steps, such as restarting components, altering replication schemes, reloading mid-tier databases into memory, acquiring a certain virtual address, and so on. Cluster agents 259, 269, and 279 may then instruct cluster manager 129 to cause an appropriate one or more of these scripts to be executed in response to detecting various failures.

In an embodiment, cluster agents 259, 269, and 279 instruct cluster manager 129 to inform cluster agents 259, 269, and 279 of any detected failures. Based on configuration data 258, cluster agents 259, 269, and 279 then coordinate with each other to determine which recovery steps to perform and how to perform those steps.

In an embodiment, cluster agents 259, 269, and 279 are configured to automatically launch when hosts 250, 260, and 270, respectively, restart. In an embodiment, each cluster agent 259, 269, and 279 must be manually started. In an embodiment, only a first cluster agent need be started. The first cluster agent then causes cluster agents to be started at each of the hosts identified by configuration data 258 as belonging to mid-tier cluster 140.

In an embodiment, cluster agents 259, 269, and 279 are configured to communicate with each other via, for instance, a common port. Cluster agents 259, 269, and 279 may share state information indicating the status of each node in mid-tier cluster 140. So, for example, a cluster agent at a previously failed node may utilize this state information to determine whether the failed node should return as an active node (in the case of no other active node existing), a standby node, or a subscriber node. However, in other embodiments, this determination is left to other components. Cluster agents 259, 269, and 279 may further communicate with each other to propagate configuration data 258 and share recovery scripts.

In an embodiment, some or all of these steps described above may be triggered instead by manual user commands, and/or scheduled jobs. In an embodiment, some or all of the steps described above may be taken by any other suitable component of hosts 250, 260, and 270, including daemons 251 and 261, based on configuration data 258. Note that, although depicted as separate from mid-tier nodes 150, 160, and 170, cluster agents 259, 269, and 279 may alternatively be conceptualized as part of mid-tier nodes 150, 160, and 170. In fact, cluster agents 259 and 269 may be part of daemons 251 and 261.

Note that each of subscriber nodes 145 may likewise be associated with a similar cluster agent and have access to similar configuration data.

Cluster Manager

Cluster manager 129 manages both a backend database cluster in the form of database system 120, as well as mid-tier database cluster 140. For example, cluster manager 129 may be resident both at backend hosts and mid-tier hosts. As used herein, "management" of a cluster comprises at least: a) monitoring for failures in processes specified as belonging to the cluster; and b) performing prescribed recovery actions in the event of some or all of said failures.

Cluster manager 129 comprises one or more processes executing at any number of hosts in backend 110 or mid-tier 130, including, potentially, hosts 250, 260, and 270. For example, cluster manager 129 may actually be a collection of coordinated cluster manager components executing at each of hosts 250, 260, and 270. However, cluster manager 129 need not necessarily execute at each or even any host used to implement mid-tier cluster 140. For instance, 1custer manager 129 may be implemented at a separate server host. Cluster manager 129 may be implemented by any clustering software capable of: 1) receiving configuration information from cluster agents 259, 269, and 279; 2) monitoring processes at hosts 250, 260, and 270 in accordance with that configuration information; and 3) performing actions described in that configuration information in response to observing failures at the monitored processes. For example, cluster manager 129 may be a collection of one or more executing instances of Oracle Clusterware.

Cluster manager 129 manages a variety of components in mid-tier cluster 140. As mentioned previously, cluster agents 259, 269, and 279 configure cluster manager 129 to manage these components. Cluster manager 129 maintains a registry of "resources" identifying each of the components it has been configured to manage, along with any information necessary to manage the components. The cluster-managed components may include, for example, some or all of: daemons 251 and 261, applications 182 and 183, database servers 252 and 262, mid-tier databases 254 and 264, sync agents 256 and 266, cluster agents 259, 269, and 279, and virtual address 231. However, in an embodiment, daemons 251 and 261 or cluster agents 259 and 269 may be responsible for managing most of these components, and cluster manager 129 is configured to deal only with failures to daemons 251 and 261 or cluster agents 259 and 269.

Cluster manager 129 monitors these managed components by periodically determining their statuses. Cluster manager 129 may determine the statuses of the managed components using any of a variety of means, including executing command line functions, pinging the components over an open socket, waiting for pings from the components, reading log files, analyzing system-collected statistics, and so on. In an embodiment, cluster manager 129 monitors some of the cluster-managed components only indirectly. For example, certain cluster-managed components may be directly monitored by daemons 251 and 261 or cluster agents 259 and 269, which in turn may relay the components' statuses to cluster manager 129.

In an embodiment, cluster manager 129 is configured to perform one or more prescribed actions in response to a component's failure to respond, or in response to status information that indicates that the component has failed. These actions may include, for example, causing any or all of hosts 250, 260, and 270 to execute scripts, terminate processes, start processes, or acquire a different virtual IP address. These actions may further include causing any or all of nodes 145, 150, 160, and 170 to assume different roles and/or load a mid-tier database into memory. These actions may be accomplished by executing command line instructions directly on hosts 250, 260, or 270, making one or more remote procedure calls, sending instructions to cache agents 259, 269, or 279, or any other suitable means. Examples of actions that cluster manager 129 may be configured to take in order to recover from various failures are described in subsequent sections.

In an embodiment, each managed component may report its status as being in any of a variety of states, such as "active," "restarting," "suspended," "failing," and so on. Cluster manager 129 may be configured to take a different action in response to some or all of these states.

In an embodiment, cluster agents 259, 269, and 279 are each part of cluster manager 129.

3.0. Functional Overview 3.1. Mid-Tier Cluster Configuration and Monitoring

Figure 3:
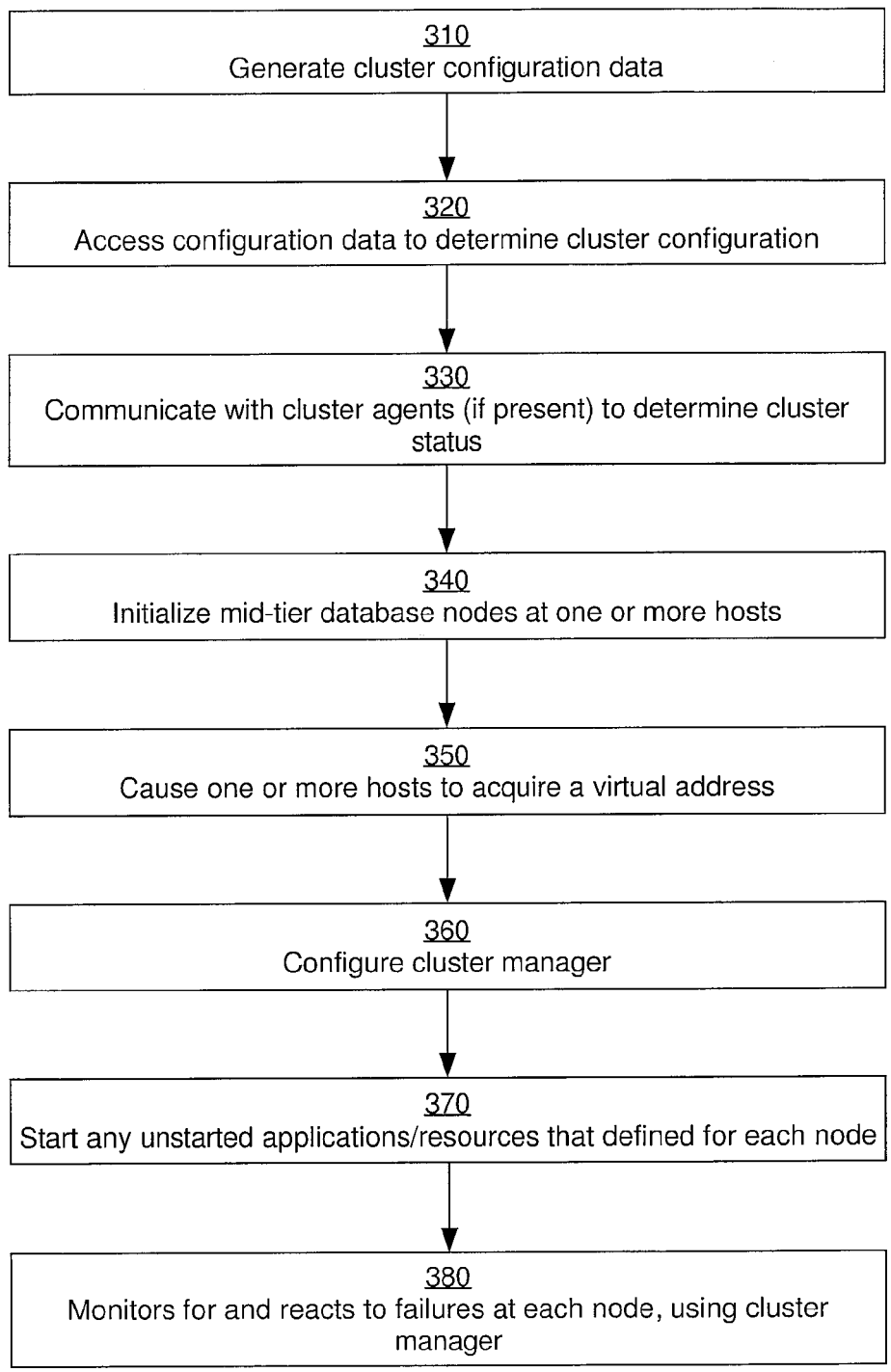
FIG. 3 is a flow chart 300 illustrating an example method of configuring a mid-tier database cluster.

FIG. 3 is a flow chart 300 illustrating an example method of configuring a mid-tier database cluster, according to an embodiment of the invention.

At step 310, a cluster administrator generates cluster configuration data, such as cluster configuration data 258. For example, the administrator may manually create a cluster configuration file such as described in section 4.1. Or, as another example, the administrator may utilize a configuration tool to generate configuration data in a shared configuration database.

The configuration data may be stored in any suitable location. For example, the administrator may save a cluster configuration file in a shared location accessible to each host, at a host from which the administrator intends to initialize the cluster, or at each host itself.

At step 320, a cluster administration utility at a first host, such as a standalone application or cluster agent 259, accesses the cluster configuration data to determine the cluster configuration. Step 330 may be triggered in response to the cluster administration utility being started, the cluster administration utility receiving a command from an administrator, and/or the cluster administration utility detecting the presence of a configuration file in a specified location. Step 320 and other subsequent steps may also or instead be performed by other cluster components, including a mid-tier database daemon or a cluster manager itself.

At step 330, the cluster administration utility communicates with cluster agents in the mid-tier database cluster to determine the state of the mid-tier database cluster, if any. For example, the cluster administration utility may need to determine whether active and standby nodes already exist. If an active node does not exist, the cluster administration utility may further need to initiate a selection process to decide which cluster agents will be responsible for initializing the active and standby nodes. The selection process may involve user input and/or may be based on a voting protocol. In an embodiment, if the cluster administration utility cannot locate a cluster agent at a host specified to be in the mid-tier database cluster, the cluster administration utility attempts to initialize a cluster agent at that host. In an embodiment, the cluster administration utility relies upon the configuration data to learn which hosts are defined to be in the cluster, as well as the manner in which the cluster administration utility should attempt to contact cluster agents at those hosts (e.g. a specified port number to which each cluster agent will listen).

At step 340, the cluster administration utility causes one or more cluster agents to initialize one or more mid-tier database nodes. For example, a cluster agent at the first host may start some or all of the components of mid-tier node 150. Information necessary to accomplish this task, such as the location(s) of scripts and executables required to start each component, are described in the configuration data read in step 330. In an embodiment, as a result of this step, a mid-tier database is created in the first host's memory. However, in an embodiment, some or all of the various resources relied upon to implement each mid-tier database node are not actually started until later steps.

In an embodiment, the initialization of step 340 involves the creation of one or more replication schemes. For example, based on both the configuration data read in step 320 and the state information communicated in step 330, the cluster administration utility may cause a first cluster agent or other cluster component at a first node to configure the first node to participate in one or more replication and/or backup schemes. For example, if there is no active node for the mid-tier database cluster, the first cluster agent may configure the first node as an active node. As another example, if the cluster administration utility receives cluster state information indicating that there is already an active node, the first cluster agent may configure the first node to be a standby node. As another example, the first cluster agent may configure the first node to periodically store snapshots, transaction logs, and other recovery information to a shared storage identified in the cluster configuration data. As another example, the first cluster agent may configure the first node to implement a mid-tier cache of a certain backend data specified in the cluster configuration data. As yet another example, if the state information for the cluster indicates that sufficient active and standby nodes already exist for the mid-tier cluster, the first cluster agent may configure the first node as a spare node. As yet another example, if the configuration data indicates that the first node is a read-only subscriber of data from an active node, the first node may be configured as a subscriber node.

At step 350, the cluster administration utility optionally causes one or more hosts to acquire a virtual address. For example, the cluster configuration data may specify that each of the cluster's active and standby nodes should have a virtual address selected from the group of 10.0.0.2 and 10.0.0.3. If the first node is the active node, for example, the first cluster agent may thus cause the first host to acquire one of the specified virtual addresses. However, in some embodiments, no virtual address is required. In an embodiment, the cluster administration utility accomplishes step 350 by simply creating virtual address resources at each of the one or more hosts, which resources may subsequently be started and monitored by the cluster manager. A virtual address resource, when started, may cause its respective host to acquire a virtual address.

At step 360, the first cluster administration utility configures a cluster manager, such as cluster manager 129, to monitor for and react to failures at the various nodes of the mid-tier database cluster. The cluster agent may accomplish this step, for example, by communicating with the cluster manager to define one or more cluster resources for the cluster manager to manage. For example, the cluster administration utility may store cluster configuration information in a shared storage such as a cluster registry, which is managed and replicated by the cluster manager. The defined resources may include the first node in general, any subcomponents of the first node, and any applications associated with the first node, per step 360. In an embodiment, the resources created for each host will vary, depending on the role assigned to the node at each host. For example, a resource may be defined for monitoring the replication of transactions from at an active node, but no such resource may defined at a spare node. In an embodiment, each resource definition describes one or more actions (e.g. an executable command) that the cluster manager may take to start, stop, and check the status of the resource. In an embodiment, some of the resource definitions may further describe dependency relationships with other resources. For instance, the definition may indicate that to start the resource, another resource must already be started.

Information necessary to create these resources, such as the location(s) of scripts and executables required to start each application, may be described in the configuration data read in step 320. The cluster administration utility may further generate certain scripts necessary to implement certain resources based on the cluster configuration data. Moreover, the cluster administration utility may rely upon the state information and/or the results of the selection process in step 330 to determine which resources should be created. For example, the cluster configuration data may define a set of applications as "active" applications associated with the active node. The cluster administration utility would create resources corresponding to these applications, and associate them with the active node.

In an embodiment, each resource definition further describes one or more actions that the cluster manager should take in response to detecting that the resource has failed. These actions may be as simple as restarting the resource or executing a recovery script at the first host. For instance, the first cluster agent may generate one or more recovery scripts that the cluster manager should execute at the first host in response to the cluster manager detecting that the first node's sync agents have stopped responding to status checks. Or the actions taken by the cluster manager in response to a failure may be more complex, such as issuing commands to other nodes in the cluster to take the place of the first node, while at the same time attempting to restart the first node. Specific types of actions that may be taken in response to specific types of failures are discussed subsequently.

At step 370, the cluster administration utility causes any unstarted applications and/or resources that are defined for the mid-tier database cluster to be started. The cluster administration utility may perform this step using any of a variety of methods, including instructing the cluster manager and/or the cluster agents to start the various applications and resources. For example, the cluster administration utility may instruct the cluster manager to start directly-linked applications 182 and 183 of FIG. 2 by executing application logic 282 and 283.

At step 380, the cluster manager monitors for and reacts to failures at some or all of the nodes, as configured in step 360. In an embodiment, only nodes with certain roles are monitored—for example, the active node, the standby node, and subscriber nodes. In an embodiment, all nodes are monitored.

In an embodiment, steps 310-380 are performed in other orders than that described above. Furthermore, some steps may be omitted—for instance, the cluster administration utility may not always communicate with cluster agents to determine the cluster state; rather, in some instances the cluster administration utility may make assumptions regarding the state of the cluster. Furthermore, the cluster administration utility may omit step 370 where there are no applications or unstarted resources are associated with a node, and may omit step 350 when there is no virtual address to assign to a host. In an embodiment, cluster administration utility performs some or all of the steps of 310-380 based on instructions from a user. In other embodiments, the cluster administration utility performs these steps without user input.

3.2. Detecting Node Failure

Subsequent sections of this disclosure describe recovery strategies for failures at specific types of mid-tier database nodes. The recovery strategies are applicable to any types of failures at a node, including failures of any subcomponents and/or linked applications. However, in an embodiment, the recovery strategies discussed below are employed only in response to failures from which recovery is not possible within a defined period of time. For example, one may recover from failures at many failed directly-linked applications by simply restarting the failed applications. As another example, it may be possible to recover from the failure of a sync agent 256 by simply restarting the sync agent 256 and performing a number of background recovery operations. Therefore, in an embodiment, "node failure" and like phrases refers more specifically to the failure of a component such as daemon 251, cluster agent 259, mid-tier database 254, or host 250.

In an embodiment, a cluster manager is configured to first attempt one or more simpler recovery strategies, such as issuing a restart command to the failed component, prior to employing any of the strategies discussed below. The strategies discussed below are performed only if the component does not restart after these one or more simpler recovery actions.

In an embodiment, a cluster manager detects node failure by periodically polling for status information from the node. The cluster manager determines that the node has failed when it receives no response to a poll, or where the node responds in a manner that is inconsistent with a properly functioning node (e.g. data indicating a status of "failing").

In an embodiment, a mid-tier database daemon or cluster agent may be capable of detecting node failure more quickly than the cluster manager. For example, the mid-tier database daemon may detect that the mid-tier database has been corrupted. Rather than waiting for the cluster manager to learn of such a failure through polling a mid-tier database monitoring process, the daemon may "push" a message to the cluster manager indicating that a failure is occurring. This message may be pushed by the daemon directly to the cluster manager, or relayed through a cluster agent. The cluster manager may thus respond much more rapidly to node failure. In fact, depending on how well the daemon can predict a failure, the cluster manager may be able to switch active nodes before a node has fully failed.

3.3. Recovering from Failure of an Active Node

Figure 4:
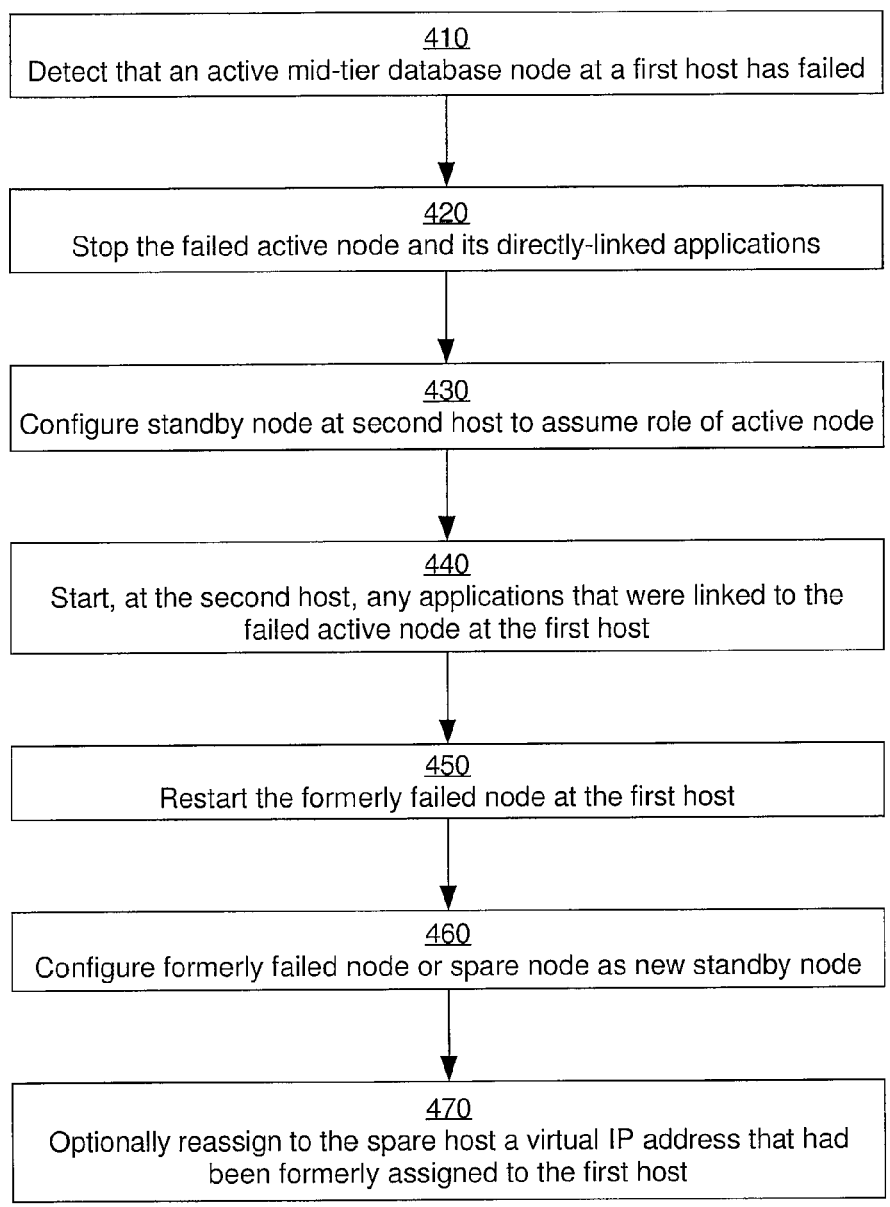
FIG. 4 is a flow chart 400 illustrating an example method for recovering from a failure at an active node.

FIG. 4 is a flow chart 400 illustrating an example method for recovering from a failure at an active node, according to an embodiment of the invention. A cluster manager may be configured to perform this method by a cluster agent at an activate node, per step 380 of FIG. 3. While the cluster manager is described as performing the steps of flow chart 400, the cluster manager may instead be configured to cause another component to perform any step of flow chart 400 by issuing one or more commands to that component.

At step 410, the cluster manager detects that an active mid-tier database node at a first host has failed. Detection of such a failure is discussed in section 3.2. The remaining steps of flow chart 400 are performed in response to this detection.

At step 420, if necessary and possible, the cluster manager stops the failed active node, as well as any applications executing at the first host that are directly linked to the failed active node.

At step 430, the cluster manager configures a standby node at a second host to assume the role of active node. The standby node is accordingly hereinafter referred to as the former standby node or the new active node. Among the many consequences of this role switch, the new active node may take steps to recover any database transactions that had been performed at the failed active node but not replicated to the standby node. For example, the new active node may consult transaction logs and other recovery information stored in a shared storage or at the backend database system to identify unreplicated transactions. Further among the consequences of the role switch, the new active node may begin permitting write transactions to its copy of the mid-tier database. Yet further among the consequences of the role switch, if the failed active node had been configured to synchronize a particular set of data with a backend data source, the standby node may begin to synchronize the particular set of data in its copy of the mid-tier database with the backend data source.

At step 440, the cluster manager starts, at the second host, any applications that were linked to the failed active node at the first host. These applications will become linked to new active node. In an embodiment, the cluster manager is able to accomplish this step because the application logic for these applications is accessible to both the first and second host, either as locally stored copies, or in a shared storage.

At step 450, if possible, the cluster manager restarts the formerly failed node at the first host. However, in some embodiments, the cluster manager may simply wait for the failed node to restart itself and announce its availability to the cluster manager.

At step 460, the cluster manager configures the formerly failed node or a spare node as a new standby node. In an embodiment, as a consequence of this step, a copy of the clustered mid-tier database will be created anew at the new standby node. For example, the cluster manager may cause the new standby node to access recovery information at the first host or shared storage to reconstruct the mid-tier database as it existed at the time of failure. Transactions performed at the new active node will then be replicated to the new standby node. In an embodiment, a previous version of the mid-tier database may still be available at the new standby node, and the standby mid-tier database may be brought up to date simply by replicating any transactions that have been performed at the new active node since the failure.

In an embodiment, as part of step 460, the cluster manager may also start one or more "standby" applications at the first host. These standby applications would have been linked to the former standby node at the time the active node failed. The cluster manager will therefore also stop these applications at the former standby node.

At step 470, in the event that the failed database is recovered to a spare node instead of the failed node, the cluster manager optionally reassigns to the spare host a virtual IP address that had been formerly assigned to the first host. Consequentially, any clients or applications that had been communicating with applications or database servers at the first host via the virtual IP address will be transparently redirected to the spare host.

In some embodiments, various steps 420-470 may occur in different orders or even not at all. In an embodiment, the cluster manager returns the failed node as a spare node. In an embodiment, when the failed node recovers, the cluster manager reconfigures the failed node to again be the active node.

3.4. Recovering from Failure of a Standby Node

Figure 5:
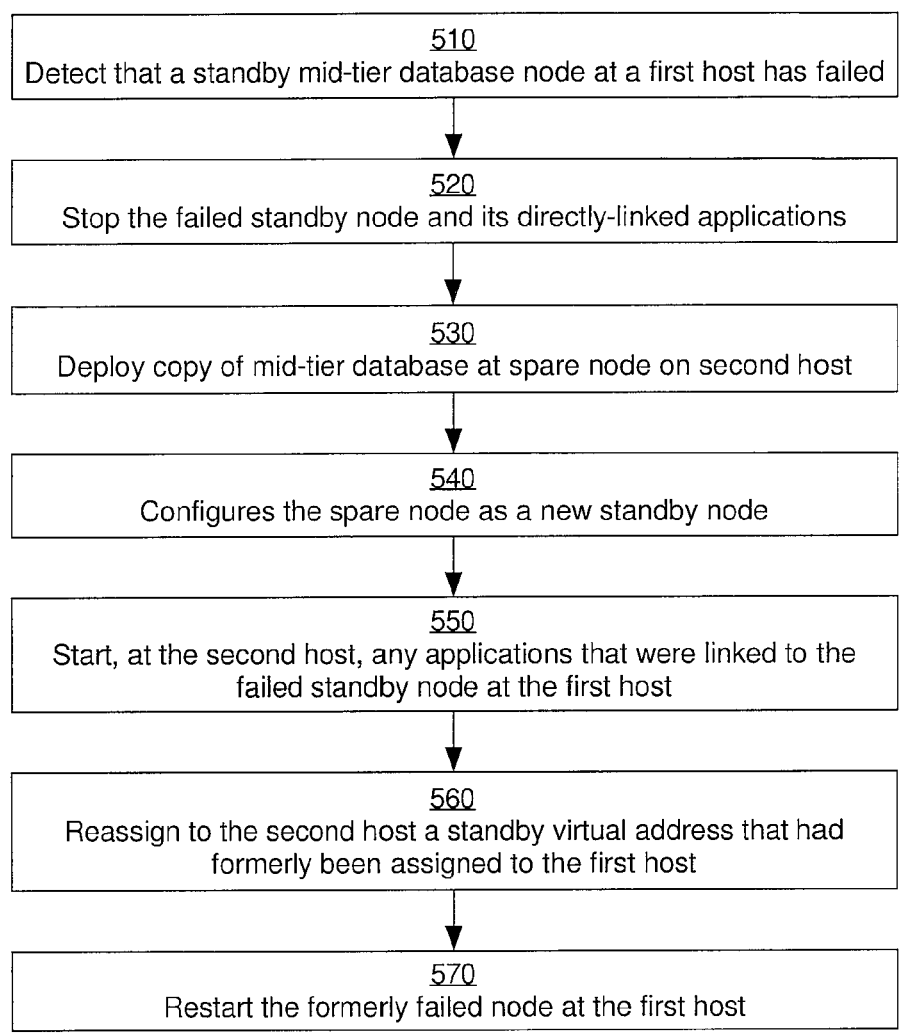
FIG. 5 is a flow chart 500 illustrating an example method for recovering from a failure at a standby node.

FIG. 5 is a flow chart 500 illustrating an example method for recovering from a failure at a standby node, according to an embodiment of the invention. A cluster manager may be configured to perform this method by a cluster agent at a standby node, per step 380 of FIG. 3. While the cluster manager is described as performing the steps of flow chart 500, the cluster manager may instead be configured to cause another component to perform any step of flow chart 500 by issuing one or more commands to that component.

At step 510, the cluster manager detects that a standby mid-tier database node at a first host has failed. Detection of such a failure is discussed in section 3.2. The remaining steps of flow chart 500 are performed in response to this detection.

At step 520, if necessary and possible, the cluster manager stops the failed standby node, as well as any applications executing at the first host that are directly linked to the failed standby node.

At step 530, the cluster manager deploys a copy of the mid-tier database at a spare node on a second host. In an embodiment, the entire mid-tier database is recreated at the spare node. For example, the spare node may create its copy of the mid-tier database based on recovery information available in a shared storage. The spare node may also or instead communicate directly with an active node to obtain the data necessary to create its copy of the mid-tier database.

At step 540, the cluster manager configures the spare node as a standby node. As a consequence, transactions performed at the active node will be replicated at the spare node. The spare node will hereinafter be referred to as the former spare node or the new standby node.

At step 550, the cluster manager starts, at the second host, any applications that were linked to the failed standby node at the first host. These applications will become linked to new standby node. In an embodiment, the cluster manager is able to accomplish this step because the application logic for these applications is accessible to both the first and second host, either as locally stored copies, or in a shared storage.

At step 560, the cluster manager optionally reassigns to the second host the virtual IP address that had been formerly assigned to the first host. Consequentially, any clients or applications that had been communicating with applications or database servers at the first host via the virtual IP address will be transparently re-routed to the new standby host. In an embodiment, the active node also addressed the former standby node using this virtual IP address, and is thus redirected automatically to the new standby node for transaction replication.

At step 570, if possible, the cluster manager starts the formerly failed node at the first host, and configures it as a spare node. However, in some embodiments, the cluster manager may simply wait for the failed node to restart itself and announce its availability to the cluster manager.

In some embodiments, various steps 520-570 may occur in different orders or even not at all. In an embodiment, once the failed node returns, the cluster manager configures the failed node to again function as a standby node, and returns the new standby node back to its former role as a spare node.

3.5. Recovering from Failure of Both an Active and Standby Node

Figure 6:
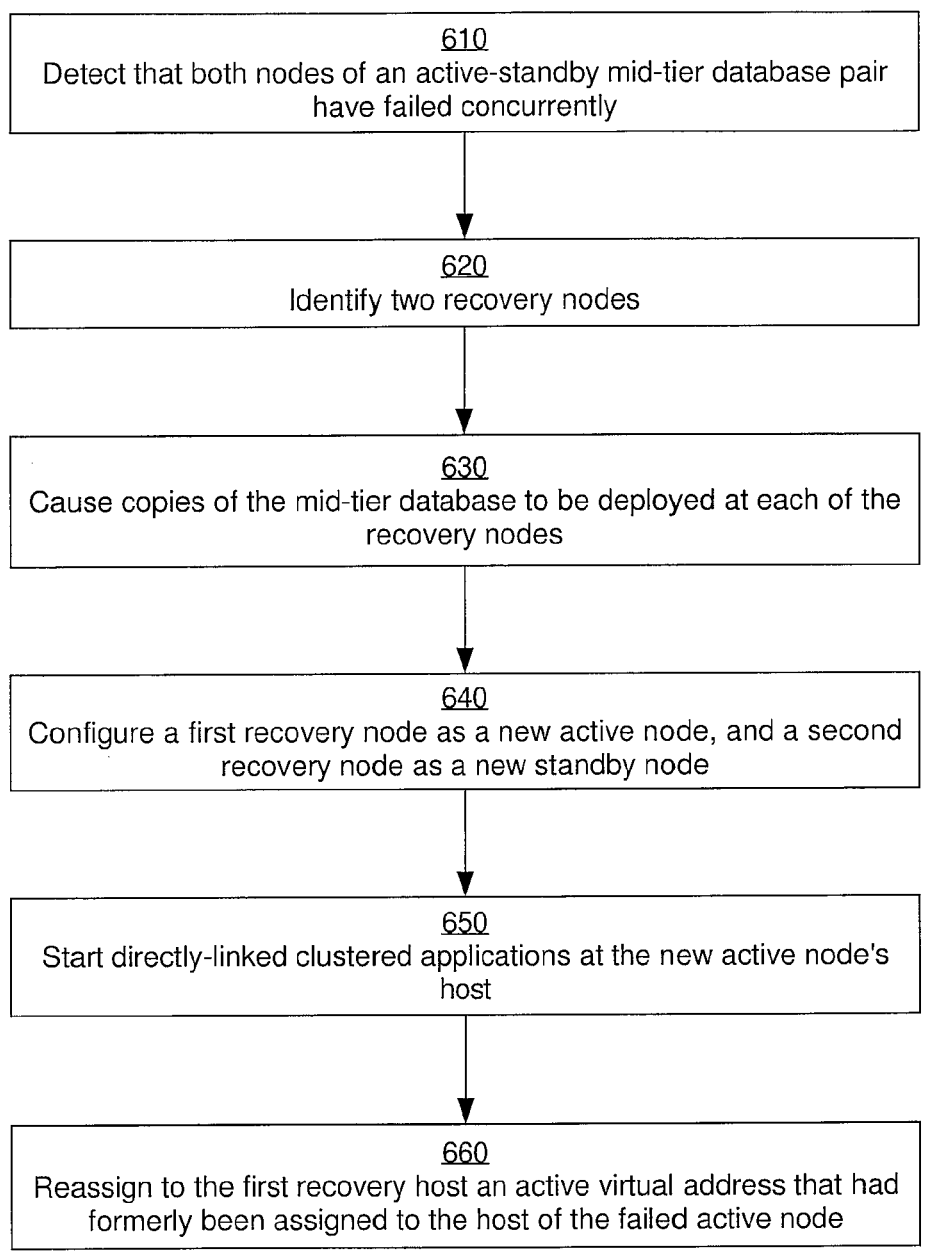
FIG. 6 is a flow chart 600 illustrating an example method for recovering from the failures of both nodes of an active-standby mid-tier database pair.

FIG. 6 is a flow chart 600 illustrating an example method for recovering from the failures of both nodes of an active-standby mid-tier database pair, according to an embodiment of the invention. A cluster manager may be configured to perform this method, for example, by a cluster agent at an active node, per step 380 of FIG. 3. In an embodiment, these recovery steps are associated with an active node resource—in other words, the cluster manager is configured to perform these recovery steps in response to the failure of the active node if the recovery steps of flow chart 400 fail to bring up a new active node. In an embodiment, a separate cluster resource may be configured to monitor the active and standby nodes as a pair, and the recovery steps of flow chart 600 may instead be associated with that cluster resource. While the cluster manager is described as performing the steps of flow chart 600, the cluster manager may instead be configured to cause another component to perform any step of flow chart 600 by issuing one or more commands to that component.

At step 610, the cluster manager detects that both nodes of an active-standby mid-tier database pair have failed concurrently. For example, while attempting to recover from the failure of an active node, the cluster manager may be unable to cause the performance of various recovery steps at the standby node. The remaining steps of flow chart 600 are performed in response to this detection.

At step 620, the cluster manager identifies two recovery nodes. In an embodiment, the recovery nodes were both spare nodes at the time of failure. In an embodiment, one or both of these nodes may be the failed nodes themselves, should the failed nodes return to the cluster within a sufficient period of time.

At step 630, the cluster manager causes copies of the mid-tier database to be deployed at each of the recovery nodes. For example, each recovery node may create a copy of the mid-tier database based on recovery information available in a shared storage. The recovery nodes may further be instructed to query the backend database system to recover some or all of their respective copies of the mid-tier database. If a recovery node is in fact one of the nodes that had failed, the recovery node may further utilize locally stored recovery information in creating its copy of the mid-tier database.

At step 640, the cluster manager configures a first recovery node as an active node, and a second recovery node as a standby node. The cluster manager further configures the recovery nodes to implement other synchronization schemes as necessary.

At step 650, the cluster manager starts any directly-linked clustered applications at the active node's host. The cluster manager also starts "standby" applications at the standby node's host, if any such applications have been defined.

At step 660, if the recovery active node resides at a different host than did the failed active node, the cluster manager optionally reassigns an active virtual IP address to the host of the recovery active node. Likewise, if the recovery standby node resides at a different host than did the failed active node, the cluster manager optionally reassigns a standby virtual IP address to the host of the recovery standby node.

In some embodiments, various steps 620-660 may occur in different orders or even not at all.

4.0. Additional Implementation Examples 4.1. Recovery for Read-Only Subscribers

According to an embodiment, the cluster manager may further be configured to monitor for and react to failures at subscriber nodes. Each subscriber node works with its own cluster agent in much the same manner as described with respect to active nodes, standby nodes, and spare nodes. In an embodiment, the cluster manager is configured to react to a failure of the subscriber node in only one way: restarting the subscriber node. However, in other embodiments, more complex recovery strategies may be used. In an embodiment, a subscriber node may also be considered a spare node.

4.2. Configuration Files

According to an embodiment of the invention, cluster configuration data, such as cluster configuration data 258, is stored at each host in the form of one or more files. For example, the cluster configuration data may be stored at each host in a file by the name of cluster.ini. Example contents of this file may be as follows:

```
[cluster1]
    MasterHosts=host1,host2,host3,host4
    SubscriberHosts=host5,host6
    ScriptInstallDir=/mycluster/TTscripts
    MasterVIP=192.168.1.1, 192.168.1.2
    SubscriberVIP=192.168.1.3
    VIPInterface=eth0
    VIPNetMask=255.255.255.0
    CacheConnect=y
    AutoRecover=y
    RepBackupDir=/shared_drive/dsbackup
    RepBackupPeriod=3600
    AppName=reader
    AppType=Standby
    AppStartCmd=/mycluster/reader/app_start.sh
    AppStopCmd=/clusterware/reader/app_stop.sh
    AppCheckCmd=/clusterware/reader/app_check.sh
    AppName=update
    AppType=Active
    AppStartCmd=/mycluster/update/app2_start.sh
    AppStopCmd=/clusterware/update/app2_stop.sh
    AppCheckCmd=/clusterware/update/app2_check.sh
```

The line reading "[cluster1]" serves two purposes. First, it defines the name of the mid-tier database cluster. Second, it signifies that every setting after it, up until the next bracketed line (if any), belongs to the "cluster1" cluster. Note that, in an embodiment, the same configuration file may be used to specify multiple logical clusters of different data sets, and that consequentially a single cluster agent may be used for multiple logical clusters.

The line beginning "MasterHosts" identifies a set of hosts on which the active node, standby node, and spare nodes may be implemented. The line beginning "StandbyHosts" identifies a set of hosts on which subscriber nodes may be implemented. The line beginning "MasterVIP," along with the three lines following it, define virtual addresses information for the cluster. The line beginning "CacheConnect" indicates that the clustered data is to be a mid-tier cache of backend data. The line beginning "AutoRecover," along with the two lines following it, define a backup scheme for the clustered data on a shared storage.

The line reading "AppName=reader," along with the four lines following it, identify an application that should be instantiated in association with the standby node. The line reading "AppName=update," along with the four lines following it, identify an application that should be instantiated in association with the active node.

5.0. Implementation Mechanism—Hardware Overview

According to one embodiment, the techniques described herein are implemented by one or more special-purpose computing devices, which are also referred to herein as "hosts" or "machines." The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
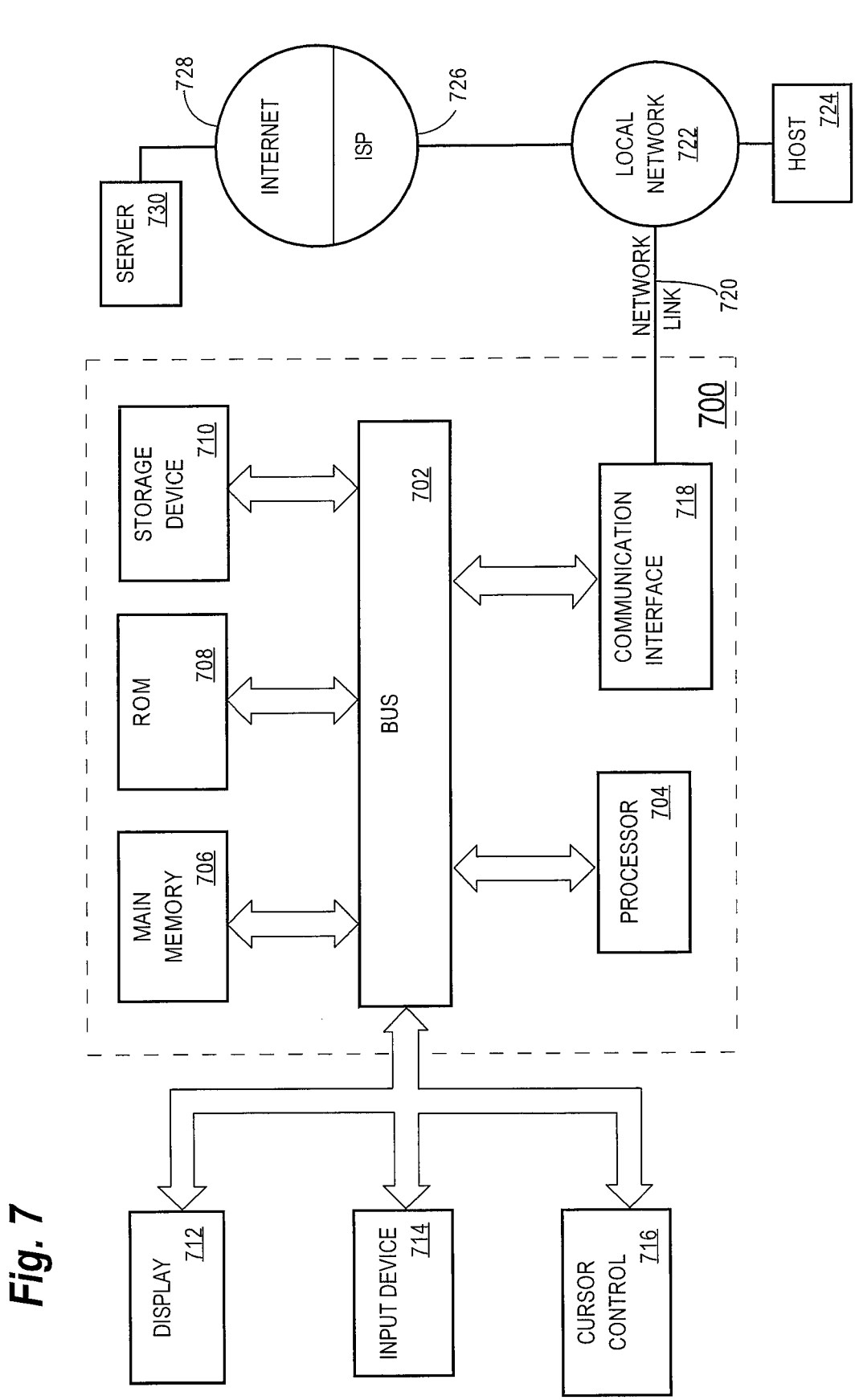
FIG. 7 is block diagram of a computer system upon which embodiments of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

6.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

According to an embodiment, each host of a mid-tier database node is assigned a virtual address. Each virtual address is mapped to a specific node role—e.g. active, or standby, subscriber, and so on. When the role of a node changes, it is assigned the virtual address mapped to that role. Applications may be configured to route database commands through the active node's virtual address, without actively monitoring the node at the virtual address to ensure that it is still active. When the active node fails, the cluster manager causes the active node's virtual address to be reassigned to the host of the new active node (e.g. the former standby node) Likewise, the virtual address of a failed standby node's host may be reassigned to the host of a new standby node. In this manner, applications may be transparently redirected to a new active node, without having to implement special logic to detect node failures and relocations. Moreover, clients of directly linked applications may communicate with those applications via the virtual address. Since the cluster manager will also automatically start the applications at the host of the new active node, the reassignment of the virtual address to the new active node ensures that the clients will automatically be redirected to working versions of the applications in the event of database failure.

In an embodiment, each cluster agent acts as its own cluster administration tool, in that each cluster agent is responsible for reading cluster configuration data when it comes online, automatically determining its role in the cluster, and then creating any appropriate cluster resources for the cluster manager to monitor.

Embodiments of the invention may also be applicable to any environment where databases are stored entirely within a volatile memory, regardless of where the databases are deployed or whether a backend database system is involved. Furthermore, embodiments of the invention may be applicable to any environment where a single machine hosts both applications and the data upon which those applications rely, again regardless of where the hosts are deployed or whether a backend database system is involved.

What is claimed is:

1. A method comprising:
    managing availability of a backend database cluster by:
        managing availability of copies of a backend database stored in a plurality of persistent storage systems, and managing availability of one or more backend database servers, executing on one or more backend computing devices, that directly read from and write data to the copies of the backend database;
    managing availability of a mid-tier database cluster by ensuring that copies of a mid-tier database are resident in volatile memories at one or more mid-tier computing devices;
        wherein the one or more mid-tier computing devices are different from the one or more backend computing devices;
        wherein the mid-tier database caches one or more elements for which changes are propagated to the backend database;
        wherein the backend database comprises a subset of data that is not cached in the mid-tier database;
        wherein the copies of the mid-tier database are databases from which one or more mid-tier applications, executing at the one or more mid-tier computing devices, directly read from and write data to, while the copies of the mid-tier database are resident in the volatile memories;
        wherein managing the availability of the backend database cluster and managing the availability of the mid-tier database cluster are performed concurrently by a cluster manager implemented by one or more computing devices.

2. The method of claim 1, wherein the backend database stores one or more elements for which changes are propagated to the mid-tier database.

3. The method of claim 1,
    wherein the one or more mid-tier computing devices respond to requests from other components, in part, by interacting with the one or more backend database servers to retrieve data from the backend database.

4. The method of claim 1, wherein the one or more mid-tier computing devices do not execute a dedicated database server process for interfacing with the copies of the mid-tier database, wherein one or more mid-tier applications instead interface with the copies of the mid-tier database by reading and writing directly to the copies of the mid-tier database.

5. The method of claim 1, further comprising:
    selecting, by a cache agent, the data to cache at the mid-tier database;
    the cluster manager also managing availability of the cache agent.

6. The method of claim 1, further comprising the cluster manager managing availability of the one or more mid-tier database applications.

7. The method of claim 1, further comprising:
    a plurality of cluster agents, executing at the one or more mid-tier computing devices, configuring the cluster manager to monitor one or more processes at each of the one or more mid-tier computing devices;
    wherein the one or more mid-tier computing devices are different than the one or more computing devices that implement the cluster manager;
    wherein each of the one or more processes at each particular mid-tier computing device of the one or more mid-tier computing devices interfaces with a copy of the mid-tier database stored at the particular mid-tier computing device.

8. The method of claim 1, further comprising:
    a plurality of cluster agents, executing at the one or more mid-tier computing devices, establishing communications with each other;
    the cluster manager sending a message to at least a particular cluster agent when a particular copy of the mid-tier database is no longer resident in the volatile memories;

in response to the message, the particular cluster agent coordinating with one or more other cluster agents to reconfigure the one or more mid-tier computing devices.

9. One or more non-transitory computer-readable media storing instructions that, when executed by one or more computing devices, cause:
managing availability of a backend database cluster by:
managing availability of copies of a backend database stored in a plurality of persistent storage systems, and
managing availability of one or more backend database servers, executing on one or more backend computing devices that directly read from and write data to the copies of the backend database;
managing availability of a mid-tier database cluster by ensuring that copies of a mid-tier database are resident in volatile memories at one or more mid-tier computing devices;
wherein the one or more mid-tier computing devices are different from the one or more backend computing devices;
wherein the mid-tier database caches one or more elements for which changes are propagated to the backend database;
wherein the backend database comprises a subset of data that is not cached in the mid-tier database;
wherein the copies of mid-tier database are databases from which one or more mid-tier applications, executing at the one or more mid-tier computing devices, directly read from and write data to, while the copies of the mid-tier database are resident in the volatile memories;
wherein managing the availability of the backend database cluster and managing the availability of the mid-tier database cluster are performed concurrently by a cluster manager implemented by one or more computing devices.

10. The one or more non-transitory computer-readable media of claim 9, wherein the backend database stores one or more elements for which changes are propagated to the mid-tier database.

11. The one or more non-transitory computer-readable media of claim 9,
wherein the one or more mid-tier computing devices respond to requests from other components, in part, by interacting with the one or more backend database servers to retrieve data from the backend database.

12. The one or more non-transitory computer-readable media of claim 9, wherein the one or more mid-tier computing devices do not execute a dedicated database server process for interfacing with the copies of the mid-tier database, wherein one or more mid-tier applications instead interface with the copies of the mid-tier database by reading and writing directly to the copies of the mid-tier database.

13. The one or more non-transitory computer-readable media of claim 9, wherein the instructions, when executed by the one or more computing devices, further cause:
selecting, by a cache agent, the data to cache at the mid-tier database;
the cluster manager also managing availability of the cache agent.

14. The one or more non-transitory computer-readable media of claim 9, wherein the instructions, when executed by the one or more computing devices, further cause the cluster manager managing availability of the one or more mid-tier database applications.

15. The one or more non-transitory computer-readable media of claim 9, wherein the instructions, when executed by the one or more computing devices, further cause:
a plurality of cluster agents, executing at the one or more mid-tier computing devices, configuring the cluster manager to monitor one or more processes at each of the one or more mid-tier computing devices;
wherein the one or more mid-tier computing devices are different than the one or more computing devices that implement the cluster manager;
wherein each of the one or more processes at each particular mid-tier computing device of the one or more mid-tier computing devices interfaces with a copy of the mid-tier database stored at the particular mid-tier computing device.

16. The one or more non-transitory computer-readable media of claim 9, wherein the instructions, when executed by the one or more computing devices, further cause:
a plurality of cluster agents, executing at the one or more mid-tier computing devices, establishing communications with each other;
the cluster manager sending a message to at least a particular cluster agent when a particular copy of the mid-tier database is no longer resident in the volatile memories;
in response to the message, the particular cluster agent coordinating with one or more other cluster agents to reconfigure the one or more mid-tier computing devices.

17. A system comprising:
a plurality of backend computing devices that are configured to execute a plurality of backend database servers that provide access to copies of a backend database stored in a plurality of persistent memories;
a plurality of mid-tier computing devices, coupled to the backend computing devices, that are configured to: (a) execute a plurality of mid-tier applications, (b) store copies of a mid-tier database exclusively in volatile memories, and (c) execute cache agents that request data from the backend database from the backend database servers and cache the requested data in the mid-tier database;
wherein the plurality of mid-tier applications directly read from and write to the copies of the mid-tier database while the copies of the mid-tier database are in the volatile memories;
wherein the mid-tier database caches one or more elements for which changes are propagated to the backend database;
wherein the backend database comprises a subset of data that is not stored in the mid-tier database;
one or more backend computing devices, coupled to the mid-tier computing devices, that are configured to execute a cluster manager that concurrently: (1) manages availability of the plurality of backend database servers and the copies of the backend database; (2) manages availability of the copies of the mid-tier database in the volatile memories.

18. The system of claim 17,
wherein the cache agents select the data to cache at the mid-tier database;
wherein the cluster manager further concurrently (3) manages availability of the cache agents.

19. The system of claim 17, wherein the cluster manager further concurrently (3) manages availability of the mid-tier applications.

20. The system of claim 17,
wherein the plurality of mid-tier computing devices further execute a plurality of cluster agents that configure the cluster manager to monitor one or more processes at each of the plurality of mid-tier computing devices;

wherein the plurality of mid-tier computing devices are different than the one or more backend computing devices that implement the cluster manager;

wherein each of the one or more processes at each particular mid-tier computing device of the plurality of mid-tier computing devices interfaces with a copy of the mid-tier database stored at the particular mid-tier computing device.

21. The system of claim 17, wherein the plurality of mid-tier computing devices further execute a plurality of cluster agents that establish communications with each other;

wherein the cluster manager is configured to send a message to at least a particular cluster agent when a particular copy of the mid-tier database is no longer resident in the volatile memories;

wherein, in response to the message, the particular cluster agent is configured to coordinate with one or more other cluster agents to reconfigure the plurality of mid-tier computing devices.

* * * * *

UNITED STATES PATENT AND TRADEMARK OFFICE
CERTIFICATE OF CORRECTION

| | | |
|---|---|---|
| PATENT NO. | : 8,306,951 B2 | Page 1 of 1 |
| APPLICATION NO. | : 12/719264 | |
| DATED | : November 6, 2012 | |
| INVENTOR(S) | : Ghosh et al. | |

It is certified that error appears in the above-identified patent and that said Letters Patent is hereby corrected as shown below:

In the drawings: On sheet 2 of 7, in figure 2, Box No. 264, line 2, delete "Databasc" and insert -- Database --, therefor.

In column 1, line 51, delete "Database" and insert -- Databases --, therefor.

In column 3, line 5, delete "Database" and insert -- Databases --, therefor.

In column 27, line 30, delete "node)" and insert -- node). --, therefor.

In column 29, line 12, in Claim 9, delete "devices" and insert -- devices, --, therefor.

In column 29, line 27, in Claim 9, delete "mid-tier" and insert -- the mid-tier --, therefor.

Signed and Sealed this
Twenty-ninth Day of January, 2013

David J. Kappos
*Director of the United States Patent and Trademark Office*